US012768491B2

(12) United States Patent
Yu

(10) Patent No.: US 12,768,491 B2
(45) Date of Patent: Oct. 20, 2026

(54) STABILIZING JOINT FOR A FAN

(71) Applicant: Orient Fan Company, City of Industry, CA (US)

(72) Inventor: Steven Yu, City of Industry, CA (US)

(73) Assignee: ORIENT FAN COMPANY, City of Industry, CA (US)

( * ) Notice: Subject to any disclaimer, the term of this patent is extended or adjusted under 35 U.S.C. 154(b) by 197 days.

(21) Appl. No.: 18/535,666

(22) Filed: Dec. 11, 2023

(65) Prior Publication Data

US 2025/0189071 A1 Jun. 12, 2025

(51) Int. Cl.

*F16M 11/10* (2006.01)
*F04D 29/64* (2006.01)
*F16M 11/28* (2006.01)
*F16M 11/38* (2006.01)
*F16M 13/02* (2006.01)

(52) U.S. Cl.

CPC ........... *F16M 11/10* (2013.01); *F04D 29/646* (2013.01); *F16M 11/28* (2013.01); *F16M 11/38* (2013.01); *F16M 13/02* (2013.01)

(58) Field of Classification Search

CPC ... F05D 25/088; F05D 2260/38; F16M 11/10; F16M 2200/024

USPC ........... 248/478, 514, 106, 423, 292.13, 324

See application file for complete search history.

(56) References Cited

U.S. PATENT DOCUMENTS 5,143,468 A * 9/1992 Pausch .................. F16M 11/12 16/322
5,435,696 A * 7/1995 Cunning ............... F04D 29/601 416/246
6,196,568 B1 * 3/2001 Stevens .................... A61G 5/12 403/107
6,244,820 B1 * 6/2001 Yilmaz ................. F04D 25/088 416/247 R
7,303,171 B1 * 12/2007 Chen ....................... B60R 11/02 396/419
9,068,602 B2 * 6/2015 Hoe ........................ F16C 11/10
9,907,373 B2 * 3/2018 Han ......................... A45C 9/00
11,773,858 B2 * 10/2023 Walker, Jr. ............ F04D 25/088 403/109.6
12,018,793 B2 * 6/2024 Tu .......................... F16M 13/00
2003/0029481 A1 * 2/2003 Ouyang .................. A45B 3/00 135/42
2009/0212184 A1 * 8/2009 Bourgeois .......... F16M 11/2064 248/295.11

(Continued)

*Primary Examiner* — Bradley Duckworth
(74) *Attorney, Agent, or Firm* — MH2 Technology Law Group, LLP

(57) ABSTRACT

An adjustable joint for coupling large industrial fans to stands, wall mounts, and the like. The adjustable joint includes a motor plate coupled to a first end of a double headed connector and a receiver coupled to an opposing end of the double head connector. The connector is substantially symmetrical and comprises a first head disposed at one end and a second head disposed at an opposing end. Each head is configured to rotate with respect to the motor plate and the receiver, respectively, when a sufficient rotational force is applied to the fan. Each head includes a torsion spring which sets a threshold amount of force required to rotate the fan, ensuring that that fan does not move unless manipulated by a user. Each head also includes means for selectively disposing the fan at one of a number of predetermined angled positions relative to the adjustable joint.

12 Claims, 18 Drawing Sheets

(56) References Cited

U.S. PATENT DOCUMENTS

| | | | | |
|---|---|---|---|---|
| 2009/0304377 | A1* | 12/2009 | Chang | F16M 13/02<br>396/428 |
| 2014/0112791 | A1* | 4/2014 | Abell | F04D 25/084<br>416/159 |
| 2020/0200190 | A1* | 6/2020 | Cen | F16M 11/28 |

* cited by examiner

STABILIZING JOINT FOR A FAN

BACKGROUND

Field of the Technology

The invention relates to the field of large industrial fans, specifically the invention relates to a joint for stabilizing large rotatable industrial fans.

Description of the Prior Art

Large industrial fans have long been used to circulate air or cool large internal spaces such as factories or warehouses. Many industrial fans can be mounted on a ceiling, however many other fans or blowers are wall mounted or are portable and can be simply placed on the floor where they are needed most.

To be more effective in certain situations however, a fan needs be slightly elevated off of the floor so as to more efficiently circulate air through a defined space. For smaller home use fans, a stand comprised of plastic is often sufficient to maintain the fan at an elevated position. Industrial fans however typically comprise a large motor, a large fan blade, and a housing which usually includes a box or barrel design that is manufactured from metal or other durable materials, thereby resulting in a fan that is too heavy for standard stands or other means for mounting the fan. This problem is made worse for adjustable industrial fans coupled to stands or wall mounts as the weight of the fan can wear out the joint between the fan housing and the stand, causing the fan to inadvertently angle or point downward, resulting in an inefficient air flow.

What is needed therefore a means for supporting large, heavy, industrial fans at a desired angle while being mounted on a stand or wall mount. The means should permit a user to change the relative angle of the fan but also strong enough to support the fan for extended amounts of time without failing or otherwise permitting the fan to slip or inadvertently change the resulting angle of air flow.

BRIEF SUMMARY

The current invention provides an adjustable joint for disposing a fan at a selected angle relative to an object. The adjustable joint includes a first pair of flanges, a first head configured to be inserted in between the first pair of flanges, and a torsion spring disposed between the first head and the first pair of flanges. A plurality of compression springs are also disposed within the first head, wherein each of the plurality of compression springs are specifically configured to drive a pin from within the first head through one of a plurality of selection apertures defined in one of the first pair of flanges.

In one embodiment, the adjustable joint has a first end of a connector coupled to the first head and a second head coupled to a second end of the connector, the second end of the connector opposing the first end of the connector. The adjustable joint also includes a second pair of flanges, wherein the second head is configured to be inserted in between the second pair of flanges. In this embodiment, the adjustable joint may also include a torsion spring disposed between the second head and the second pair of flanges and a plurality of compression springs disposed within the second head, wherein each of the plurality of compression springs are configured to drive a pin from within the second head through one of a plurality of selection apertures defined in one of the second pair of flanges. Also in this embodiment, the first pair of flanges are disposed on a motor plate and the second pair of flanges are disposed on a receiver.

In another embodiment, the first pair of flanges are disposed on a motor plate and the first head is disposed on a receiver. In this embodiment the receiver is configured to be coupled to a stand or wall mount.

In another embodiment, the first pair of flanges are disposed on a receiver and the first head is disposed on a motor plate.

In a further embodiment, the adjustable joint also includes a first end of a connector coupled to the first pair of flanges and a second pair of flanges coupled to a second end of the connector, the second end of the connector opposing the first end of the connector. The adjustable joint further includes a second head, wherein the second head is configured to be inserted in between the second pair of flanges. In this embodiment, the first head may be disposed on a motor plate and the second head is disposed on a receiver.

In a further embodiment, each of the plurality of compression springs of the adjustable joint are disposed within a corresponding plurality of selection bores defined within the first head.

In another embodiment, the torsion spring of the adjustable joint comprises a fixed end coupled to at least one of the first pair of flanges.

The current invention also provides a fan which includes a fan housing coupled to a motor, an adjustable joint coupled to the motor at a first end of the adjustable joint, and a mounting means coupled to a second end of the adjustable joint, the second of the adjustable joint opposing the first end of the adjustable joint. The adjustable joint itself includes a first pair of flanges, a first head configured to be inserted in between the first pair of flanges, and a torsion spring disposed between the first head and the first pair of flanges. A plurality of compression springs are also disposed within the first head, wherein each of the plurality of compression springs are configured to drive a pin from within the first head through one of a plurality of selection apertures defined in one of the first pair of flanges.

In one embodiment, the adjustable joint further comprises a connector that is disposed between the first end of the adjustable joint and the second end of the adjustable joint.

In another embodiment, the mounting means comprises either a stand or a wall mount.

In another embodiment, the adjustable joint further comprises a receiver disposed on the second end of the adjustable joint and coupled to the mounting means.

The current invention also provides a method for adjusting a relative angle between a fan and a mounting means. The method includes disposing the fan at a first angular position relative to the mounting means, rotating the fan in a first direction relative to the mounting means, and then locking the fan at a second angular position relative to the mounting means. Rotating the fan in a first direction relative to the mounting means includes rotating a first pair of flanges relative to a first head within an adjustable joint that is coupled between the fan and the mounting means.

In one embodiment, rotating the first pair of flanges relative to the first head within an adjustable joint coupled between the fan and the mounting means specifically includes pushing a pin disposed within the first head when contact is made between at least one of the first pair of flanges and the pin, moving the pin within a selection bore defined within the first head, and compressing a spring coupled to the pin.

In a further embodiment, locking the fan at the second angular position relative to the mounting means specifically includes aligning a selection aperture defined in at least one of the first pair of flanges with a selection bore defined in the first head, expanding a spring disposed within the selection bore, and then pushing a pin disposed within the selection bore through the selection aperture.

In a further embodiment, rotating the fan in the first direction relative to the mounting means specifically includes overcoming a threshold force that is provided by a spring within the adjustable joint, wherein a fixed end of the spring is coupled to at least one of the first pair of flanges and wherein a free end of the spring is disposed within the first head.

In one embodiment, rotating the fan in the first direction relative to the mounting means also includes rotating a second pair of flanges relative to a second head within the adjustable joint, wherein the first pair of flanges and the first head are disposed at one end of the adjustable joint, and wherein the second pair of flanges and the second had are disposed at an opposing end of the adjustable joint.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
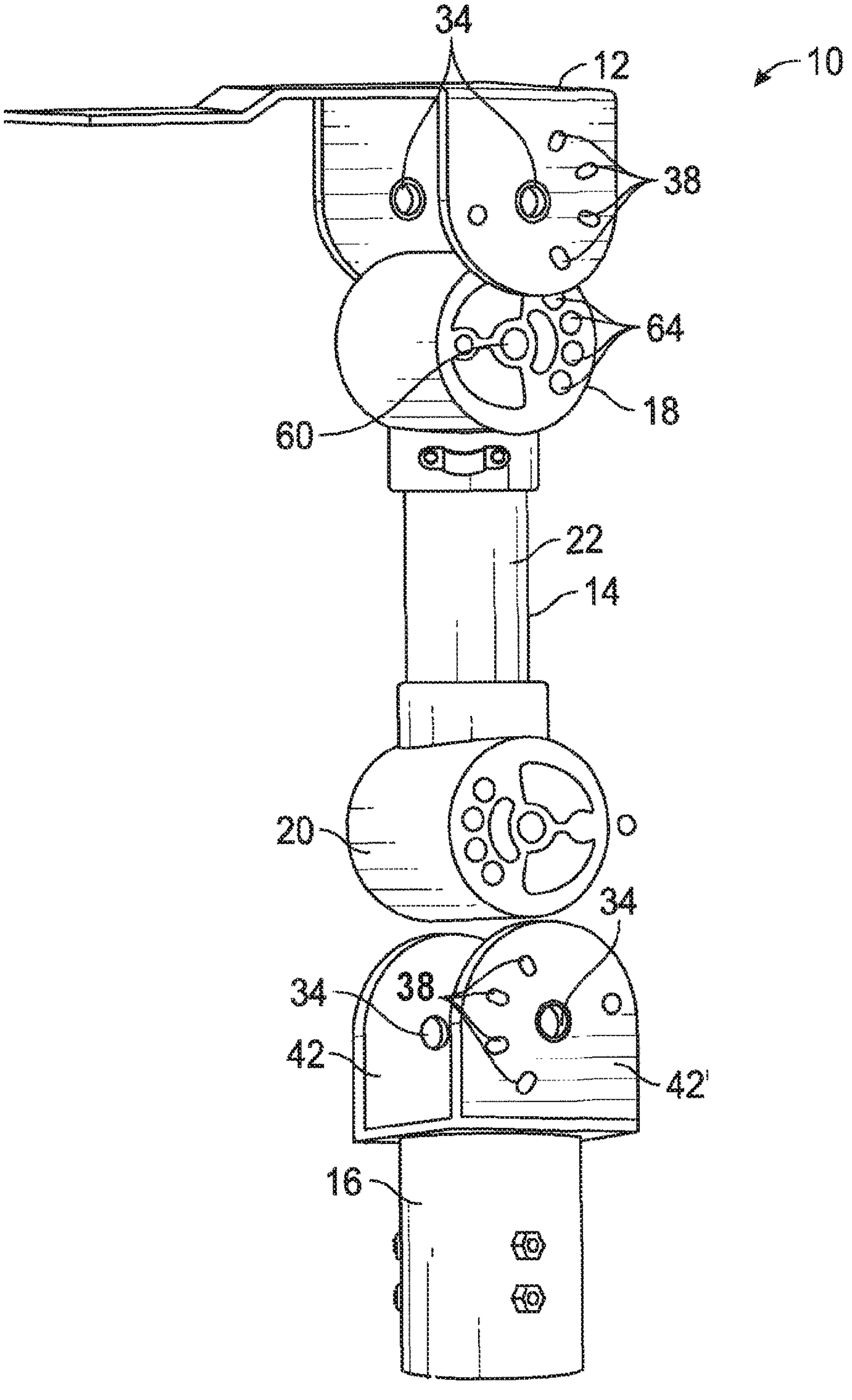
FIG. 1 is a magnified partially exploded view of the adjustable joint of the current invention.

Greater detail of the adjustable joint of the current invention may be had by turning to the exploded view of FIG. 1 where the adjustable joint is denoted generally by reference numeral 10. The adjustable joint 10 comprises a motor plate 12 coupled to a first end of a double headed connector 14 and a receiver 16 coupled to an opposing end of the double head connector 14. The connector 14 is substantially symmetrical and comprises a first head 18 disposed at one end and a second head 20 disposed at an opposing end, the first head 18 and second head 20 configured to be coupled to the motor plate 12 and the receiver 16, respectively, as is further detailed below. The connector 14 further comprises a longitudinal body 22 extending between the first head 18 and the second head 20. The body 22 is substantially cylindrical with a circular cross section, however in alternative embodiments the connector 14 comprises a substantially square or rectangular cross section. The first head 18 and the second head 20 are integrally formed on either lateral end of the connector 14, however according to other embodiments, the first and second head 18, 20 are coupled to a corresponding lateral end of the body 22 of the connector 14 via a plurality of screws, bolts, nuts, welds, or other known coupling means.

Figure 2:
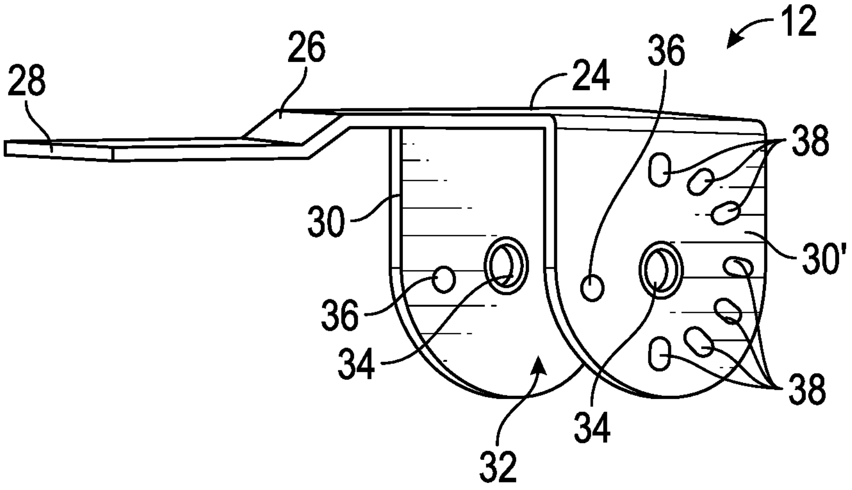
FIG. 2 is a perspective level view of a motor plate of the adjustable joint of FIG. 1.

Greater detail of the motor plate 12 is seen in FIG. 2 which comprises a first horizontal surface 24 that is joined together with a second horizontal surface 28 via an incline surface 26. The first horizontal surface 24 is seen in FIG. 2 to be disposed at a first elevation which is vertically higher relative to a second elevation of the second horizontal surface 28, however in alternative embodiments the second horizontal surface 28 is disposed vertically higher or even with the first horizontal surface 24. Disposed on a bottom portion of the first horizontal surface 24 are a pair of receiving flanges, namely a first receiving flange 30 and a second receiving flange 30'. According to certain embodiments, both receiving flanges 30, 30' comprise a substantially semi-circular shape and are disposed parallel relative to each other so as to create a receiving area 32 there between. Additionally, according to certain embodiments, both receiving flanges 30, 30' comprise a flange aperture 34 defined in the middle or center of each respective flange 30, 30', and an actuation aperture 36 that is defined adjacent to the flange aperture 34 or at an off-center position within each flange 30, 30'. In one particular embodiment, the second flange 30' further comprises a plurality of selection apertures 38 defined therein, for example, in a semi-circular or partial circumferential pattern.

Figure 3:
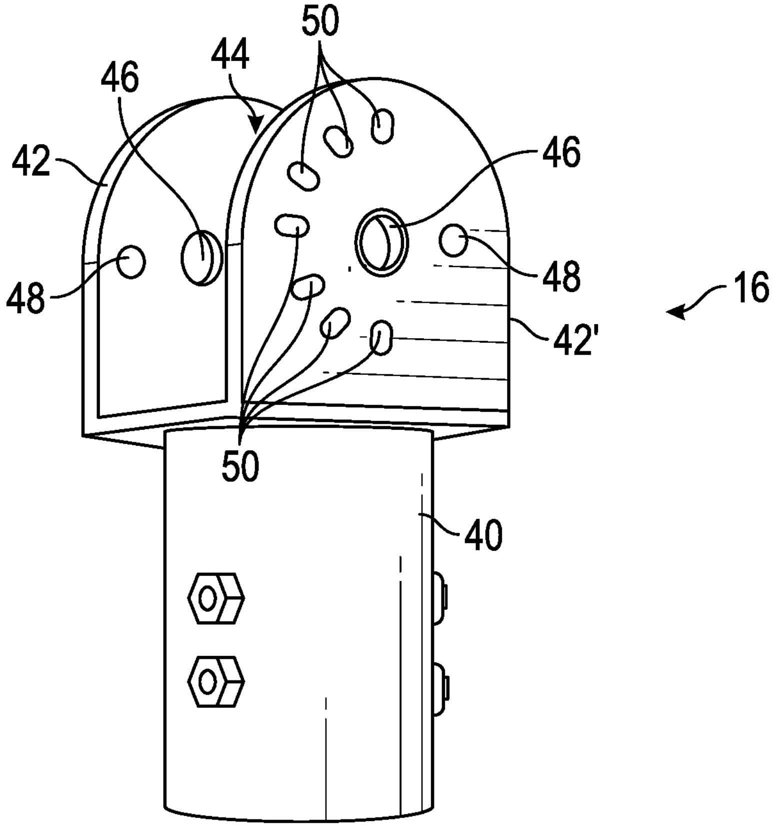
FIG. 3 is a perspective level view of a receiver of the adjustable joint of FIG. 1.

Similarly, according to certain embodiments, the receiver 16 as best seen in FIG. 3 comprises a base 40. The base 40 comprises a substantially cylindrical shape with a hollow interior configured to accommodate a stand or other mounting means therein. Disposed on top of the base 40 are a pair of receiving flanges, namely a first receiving flange 42 and a second receiving flange 42'. According to certain embodiments, both receiving flanges 42, 42' comprise a substantially semi-circular shape and are disposed parallel relative to each other so as to create a receiving area 44 there between. Additionally, according to certain embodiments, both receiving flanges 42, 42' comprise a flange aperture 46 defined in the middle or center of each respective flange 42, 42', and an actuation aperture 48 that is defined adjacent to the flange aperture 46 or at an off-center position within each flange 42, 42'. In one particular embodiment, the second flange 42' further comprises a plurality of selection apertures 50 defined therein, for example, in a semi-circular or partial circumferential pattern.

Figure 4A:
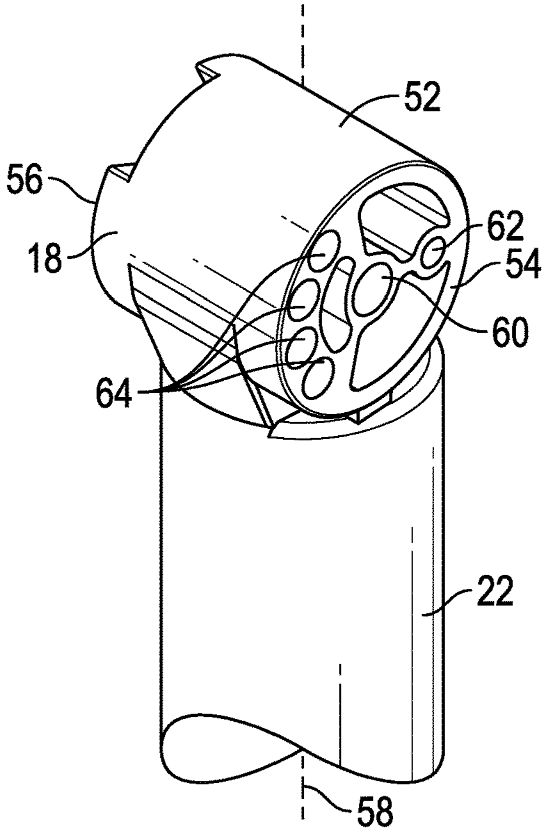
FIG. 4A is a perspective frontal view of a head of the adjustable joint of FIG. 1.
Figure 4B:
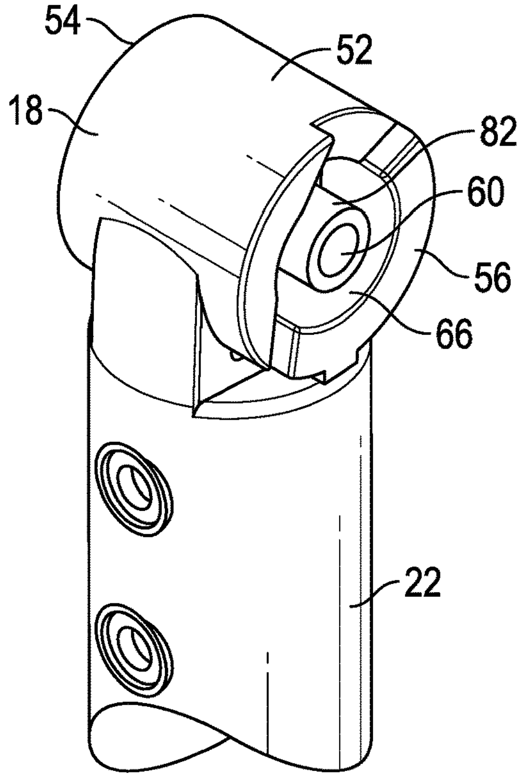
FIG. 4B is a perspective rear view of the head of the adjustable joint of FIG. 4A.

Greater detail of the heads 18, 20 according to certain embodiments may be seen in FIGS. 4A and 4B. For clarity and ease of description purposes, only the first head 18 and a portion of the body 22 is shown, however it is to be expressly understood that the second head 20 disposed at the opposing end of the body 22 is substantially similar to what is described below and to what is seen in the figures. The first head 18 according to certain embodiments comprises a substantially cylindrical body 52 that is horizontally disposed, with a first lateral end 54 and a second lateral end 56 of the body 52 being orientated perpendicular relative to a vertical axis 58 of the body 22 of the connector 14. According to certain embodiments, both the first lateral end 54 and the second lateral end 56 comprise a center bore 60. The first lateral end 54 further comprises an actuation bore 62 that is defined adjacent to the center bore 60 or otherwise off-center within the first lateral end 54. In one particular embodiment, the first lateral end 54 further comprises a plurality of selection bores 64 defined therein, for example, in a semi-circular or partial circumferential pattern.

Turning to the second lateral end 56 best seen FIG. 4B, the center bore 60 is surrounded or encompassed by a cavity 66 defined through a portion of the longitudinal length of the cylindrical body 52. According to certain embodiments, the cavity 66 is configured to accommodate a torsion spring 74 therein as further discussed below.

Figure 5:
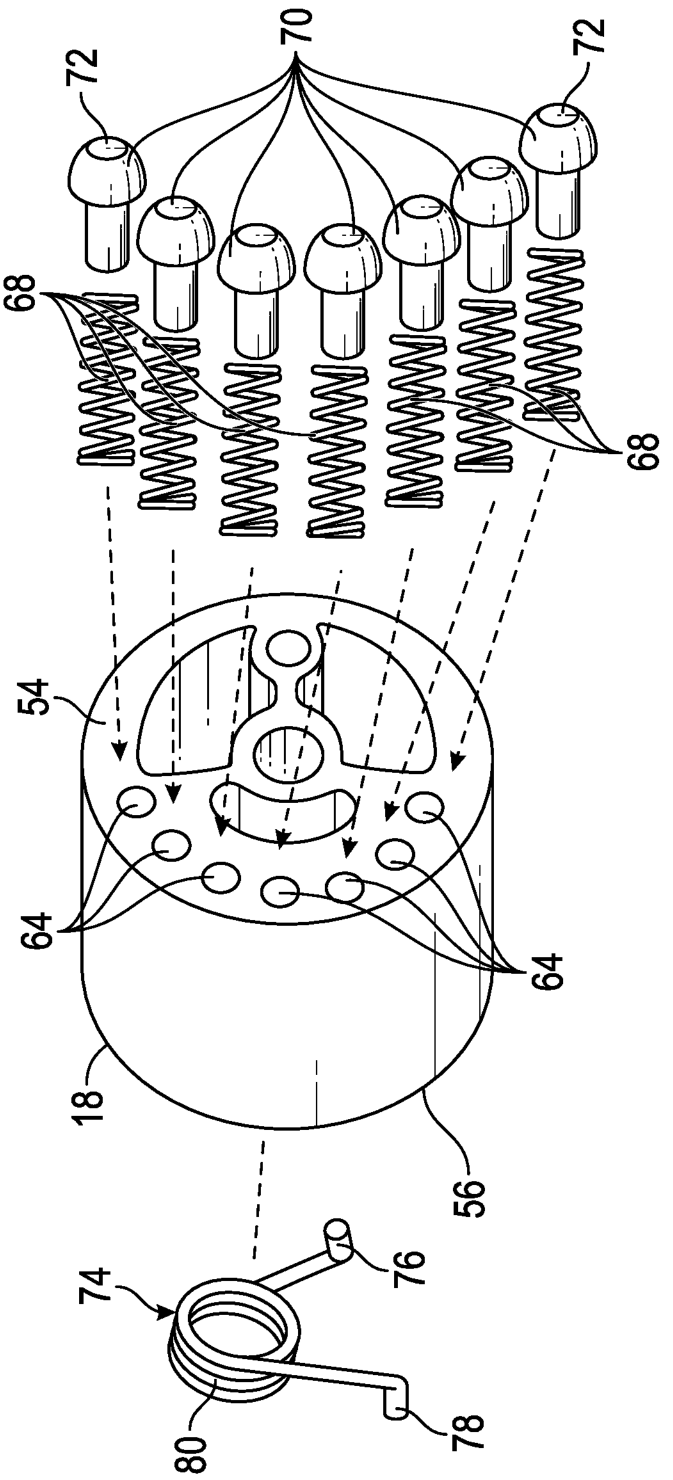
FIG. 5 is a magnified perspective view of the head of the adjustable joint of FIG. 4A.

FIG. 5 is an exploded view of the first head 18 of the connector 14 and the components disposed therein, however it is to be expressly understood that a substantially similar configuration is also present for the second head 20 of the connector 14. According to at least one embodiment, a compression spring 68 and a pin 70 are disposed within each of the plurality of the selection bores 64 defined in the first lateral end 54. For example, within each selection bore 64, the compression spring 68 is inserted in between a rear wall or rear portion of the selection bore 64 and the pin 70, wherein at least a portion of a tip 72 of the pin 70 is disposed adjacent to the opening of the selection bore 64 when the compression spring 68 is in an uncompressed or expanded state. The tip 72 comprises a substantially rounded or conical shape, however in certain other embodiments the tip 72 comprises other suitable shapes or configurations. Disposed in the cavity 66 defined in the second lateral side 56 is a torsion spring 74. According to certain embodiments the torsion spring 74 comprises a free end 76, a fixed end 78, and coiled portion 80 disposed there between, the free end 76 being configured to be freely disposed and to move relative to the internal surfaces of the cavity 66. The fixed end 78 of the torsion spring 74 extends out of and past the opening of the cavity 66 while the coiled portion 80 of the torsion spring 74 is disposed over or around an elongated column 82 comprising the center bore 60, thereby allowing the torsion spring 74 to nest within the first head 18 and at least partially compress around the column 82 as is described in further detail below.

Figure 6:
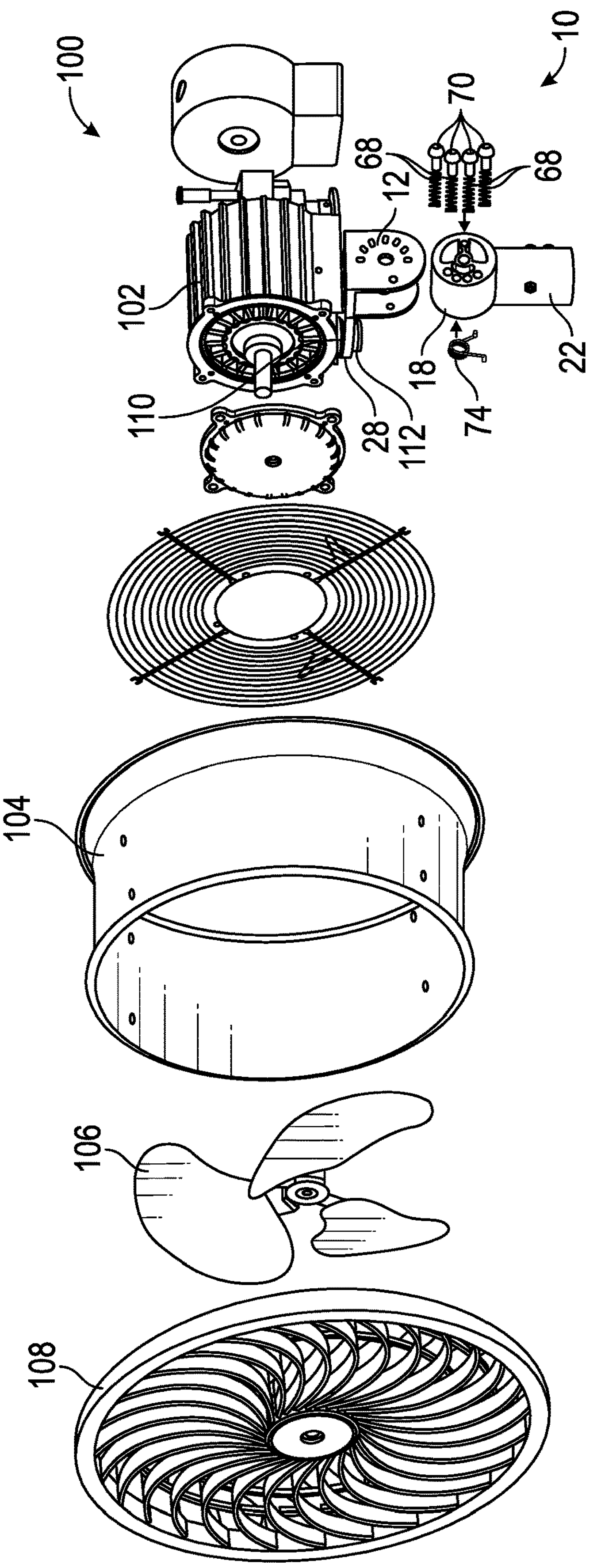
FIG. 6 is an exploded view of a fan incorporating the adjustable joint of FIG. 1.

Greater context of how the adjustable joint 10 is coupled to a large industrial fan 100 comprising a motor 102, a barrel 104, a fan blade 106, and a fan grill 108 is seen in the exploded view of FIG. 6. Again it is emphasized that for clarity and ease of description purposes, only the first head 18 and a portion of the body 22 is shown, however it is to be expressly understood that the second head 20 disposed at the opposing end of the body 22 undergoes a similar process when being coupled to a stand or other mounting means to what is described below and to what is seen in the figures.

According to certain embodiments, to couple the adjustable joint 10 to a fan 100, the motor plate 12 is first coupled to a bottom portion of the motor 102 by threading an opening or other aperture (not seen) defined through the second horizontal surface 28 of the motor plate 12 over a bolt extending from the motor 102. A nut 112 or other equivalent means is then used to secure the motor plate 12 to the motor 102, however according to certain embodiments, the motor plate 12 is still permitted to rotate horizontally relative to the motor 102 as needed. The connector 14 is then coupled to the motor plate 12 by inserting one of the heads, for example the first head 18 as seen in FIGS. 1 and 6, into the receiving area 32 defined between the first and second flanges 30, 30'. The center bore 60 of the first head 18 is aligned with the flange aperture 34 defined through the first and second flanges 30, 30'. A bolt, screw, or other coupling means is threaded or inserted into the flange aperture 34 of the first flange 30, through the length of the center bore 60 defined through the body 52 of the first head 18, and then through the opposing flange aperture 34 defined in the second flange 30'. A nut or other fastening means is coupled to the opposing end of the bolt extending from the second flange 30', thereby coupling the connector 14 to the motor plate 12 while still permitting the first head 18 to rotate relative to the first and second flanges 30, 30'. According to certain embodiments, as the first head 18 is being coupled to the motor plate 12, each of the plurality of selection bores 64 defined within the first lateral end 54 of the first head 18 are aligned with the corresponding plurality of selection apertures 38 defined through the second flange 30', however in alternative embodiments the plurality of selection bores 64 are aligned with the selection apertures 38 only after the center bore 60 has been aligned with the flange apertures 34 of the first and second flanges 30, 30'.

The fixed end 78 of the torsion spring 74 is threaded or inserted through the actuation aperture 36 defined in the first flange 30. The actuation aperture 36 is configured to accommodate or maintain the fixed end 78 therein, however according to certain embodiments the fixed end 78 of the torsion spring 74 is welded or permanently coupled to the first flange 30. The free end 76 of the torsion spring 74 is placed or inserted into an internal portion of the first head 18.

According to certain embodiments, the fan 100 is rotated vertically with respect to the adjustable joint 10 which in turn rotates the flanges 30, 30' of the motor plate 12 about the static first head 18 until at least one selection aperture 38 defined in the second flange 30' algins with the chosen selection bore 64, thereby allowing the compression spring 68 disposed therein to expand and drive the pin 70 toward to the first lateral end 54 of the first head 18. The tip 72 of the pin 70 exits the chosen selection bore 64 and is then inserted through the corresponding selection aperture 38 aligned with the chosen selection bore 64. Because the tip 72 comprises a substantially conical or tapered shape, any backwards or reverse movement of the pin 70 is prevented, thereby locking the first head 18 into a fixed position relative to the first and second flanges 30, 30' of the motor plate 12. The free end 76 of the torsion spring 74 also expands within the first head 18 and assists in maintaining the first and second flanges 30, 30' at a fixed rotational orientation within the first head 18.

A similar process is carried out for coupling the second head 20 to the receiver 16 which is in turn coupled to or integrated with a stand, wall mount, or other mounting means. Specifically, according to certain embodiments, the second head 20 as seen in FIG. 1 is inserted into the receiving area 44 defined between the first and second receiving flanges 42, 42'. The center bore 60 of the second head 20 is aligned with the flange aperture 46 defined through the first and second receiving flanges 42, 42'. A bolt, screw, or other coupling means is threaded or inserted into the flange aperture 46 of the first receiving flange 42, through the length of the center bore 60 defined through the body 52 of the second head 20, and then through the opposing flange aperture 46 defined in the second receiving flange 42'. A nut or other fastening means is coupled to the opposing end of the bolt extending from the second receiving flange 42', thereby coupling the connector 14 to the receiver 16 while still permitting the second head 20 to rotate relative to the first and second receiving flanges 42, 42'. According to certain embodiments, as the second head 20 is being coupled to the receiver 16, each of the plurality of selection bores 64 defined within the first lateral end 54 of the second head 20 are aligned with the corresponding plurality of selection apertures 50 defined through the second receiving flange 42', however in alternative embodiments the plurality of selection bores 64 are aligned with the selection apertures 50 only after the center bore 60 has been aligned with the flange apertures 46 of the first and second receiving flanges 42, 42'. The fixed end 78 of the torsion spring 74 is threaded or inserted through the actuation aperture 48 defined in the first receiving flange 42. The actuation aperture 48 is configured to accommodate or maintain the fixed end 78 therein, however according to certain embodiments the fixed end 78 of the torsion spring 74 is welded or permanently coupled to the first flange 42.

Figure 7:
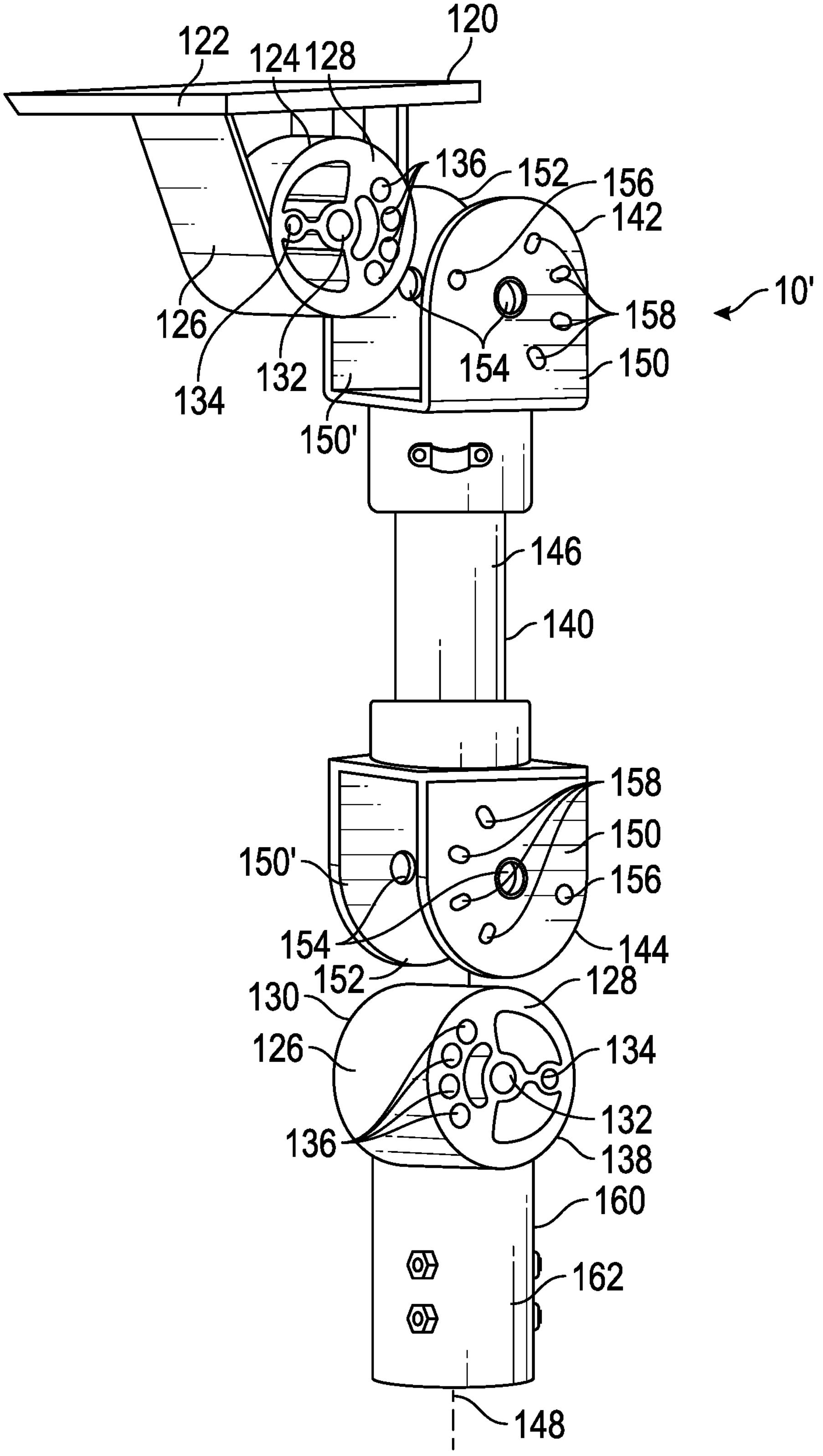
FIG. 7 is an alternative embodiment of the adjustable joint of FIG. 1 wherein a plurality of flanges and a plurality of heads are in reversed or opposing positions.
Figure 8:
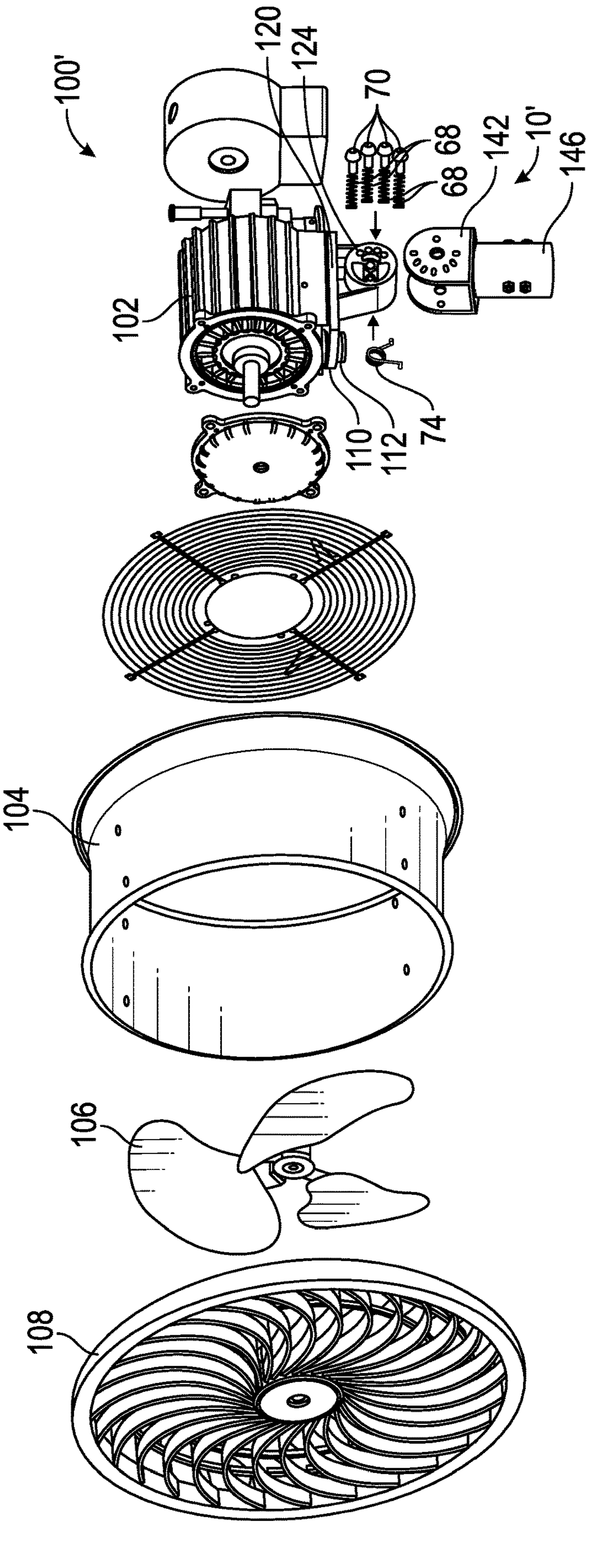
FIG. 8 is an exploded view of a fan incorporating the alternative embodiment of the adjustable joint of FIG. 7.

According to certain other embodiments, the orientation or coupling configuration of the adjustable joint is reversed or mirrored as seen in FIGS. 7 and 8, where the alternative adjustable joint is denoted by reference numeral 10'. Specifically, the alternative adjustable joint 10' comprises the same coupling mechanism discussed above, however with the exception that the heads and flanged portions of the alternative adjustable joint 10' have swapped or traded positions. As seen in FIG. 7, for example, the alternative adjustable joint 10' comprises a motor plate 120 coupled to a first end of a double flange connector 140 and a receiver 160 coupled to an opposing end of the double flange connector 140. The double flange connector 140 is substantially symmetrical and comprises a first flanged portion 142 disposed at one end and a second flanged portion 144 disposed at an opposing end, the first flanged portion 142 and second flanged portion 144 configured to be coupled to the motor plate 120 and the receiver 160, respectively, as is further detailed below. The connector 140 further comprises a longitudinal body 146 extending between the first flanged portion 142 and the second flanged portion 144. The body 146 is substantially cylindrical with a circular cross section, however in alternative embodiments the connector 140 comprises a substantially square or rectangular cross section. The first flanged portion 142 and the second flanged portion 144 are integrally formed on either lateral end of the connector 140, however according to other embodiments, the first and second flanged portions 142, 144 are coupled to a corresponding lateral end of the body 146 of the connector 140 via a plurality of screws, bolts, nuts, welds, or other known coupling means.

According to certain embodiments, the motor plate 120 as seen in FIG. 7 comprises a substantially horizontal surface 122. Disposed on a bottom portion of the horizontal surface 122 is a first head 124 which, according to certain embodiments, comprises a substantially cylindrical body 126 that is horizontally disposed, with a first lateral end 128 and a second lateral end 130 of the body 126 being orientated perpendicular relative to a vertical axis 148 of the body 146 of the connector 140. According to certain embodiments, both the first lateral end 128 and the second lateral end 130 comprise a center bore 132. The first lateral end 128 further comprises an actuation bore 134 that is defined adjacent to the center bore 132 or otherwise off-center within the first lateral end 128. In one particular embodiment, the first lateral end 128 further comprises a plurality of selection bores 136 defined therein, for example, in a semi-circular or partial circumferential pattern.

Similarly, according to certain embodiments, the receiver 160 as also seen in FIG. 7 comprises a base 162. The base 162 comprises a substantially cylindrical shape with a hollow interior configured to accommodate a stand or other mounting means therein. Disposed on top of the base 162 is a second head 138, the second head 138 comprising a center bore 132, an actuation bore 134, and a plurality of selection bores 136 defined in a first lateral end 128 thereof in the same manner and orientation as described above.

Greater detail of the first flanged portion 142 and the second flanged portion 144 according to certain embodiments may also be seen in FIG. 7. For clarity and ease of description purposes, only the first flanged portion 142 is described below, however it is to be expressly understood that the second flanged portion 144 disposed at the opposing end of the body 146 is substantially similar to what is described above. Turning to the first flanged portion 142 of the connector 140, the first flanged portion 142 comprises a pair of receiving flanges, namely a first receiving flange 150 and a second receiving flange 150'. According to certain embodiments, both receiving flanges 150, 150' comprise a substantially semi-circular shape and are disposed parallel relative to each other so as to create a receiving area 152 there between. Additionally, according to certain embodiments, both receiving flanges 150, 150' comprise a center aperture 154 defined in the middle or center of each respective flange 150, 150', and an actuation aperture 156 that is defined adjacent to the center aperture 154 or at an off-center position within each flange 150, 150'. In one particular embodiment, the first flange 150 further comprises a plurality of selection apertures 158 defined therein, for example, in a semi-circular or partial circumferential pattern.

According to certain embodiments, to couple the alternative adjustable joint 10' to a fan 100 seen in FIG. 8, the motor plate 120 is first coupled to a bottom portion of the motor 102 by threading an opening or other aperture (not seen) defined through the horizontal surface 122 of the motor plate 120 over a bolt extending from the motor 102. A nut 112 or other equivalent means is then used to secure the motor plate 120 to the motor 102. The connector 140 is then coupled to the motor plate 120 by disposing the receiving area 152 of one of the flange portions, for example the first flange portion 142 as seen in FIGS. 7 and 8, over the first head 124. The center bore 132 of the first head 124 is aligned with the flange aperture 154 defined through the first and second flanges 150, 150', after which a bolt, screw, or other coupling means is threaded or inserted into the flange aperture 154 of the first flange 150, through the length of the center bore 132 defined through the body 126 of the first head 124, and then through the opposing flange aperture 154 defined in the second flange 150'. A nut or other fastening means are coupled to the bolt, thereby coupling the connector 140 to the motor plate 120 while still permitting the first flange portion 142 to rotate relative to the first head 124. According to certain embodiments, as the first flange portion 142 is being coupled to the motor plate 120, each of the plurality of selection bores 136 defined within the first lateral end 128 of the first head 124 are aligned with the corresponding plurality of selection apertures 158 defined through the first flange 150, however in alternative embodiments the plurality of selection bores 136 are aligned with the selection apertures 158 only after the center bore 132 has been aligned with the flange apertures 154 of the first and second flanges 150, 150'.

The fixed end 78 of the torsion spring 74 is threaded or inserted through the actuation aperture 156 defined in either the first or second flanges 150, 150'. The actuation aperture 156 is configured to accommodate or maintain the fixed end 78 therein, however according to certain embodiments the fixed end 78 of the torsion spring 74 is welded or permanently coupled to the first or second flange 150, 150'. The free end 76 of the torsion spring 74 is placed or inserted into the first head 124. According to certain embodiments, the fan 100 is rotated vertically with respect to the alternative adjustable joint 10' which in turn rotates the first head 124 between the static flanges 150, 150' of the first flanged portion 142 until at least one selection aperture 158 defined in the first flange 150 algins with the chosen selection bore 136, thereby allowing the compression spring 68 disposed therein to expand and drive the pin 70 toward to the first lateral end 128 of the first head 124. The tip 72 of the pin 70 exits the chosen selection bore 136 and is then inserted through the corresponding selection aperture 158 aligned with the chosen selection bore 136. Because the tip 72 comprises a substantially conical or tapered shape, any backward or reverse movement of the pin 70 is prevented thereby locking the first head 124 into a fixed position relative to the first and second flanges 150, 150' of the first flanged portion 142. The free end 76 of the torsion spring 74 also expands within the first head 124 and assists in maintaining the first head 124 at a fixed rotational orientation relative to the first and second flanges 150, 150'.

According to some embodiments, a similar process is carried out for coupling the second flanged portion 144 to the receiver 160 which is in turn coupled to or integrated with a stand, wall mount, or other mounting means for a fan in the same manner described above.

In some embodiments, the adjustable joint 10 is used to a couple a fan 100 to a stand 180 as seen in FIGS. 9A-9D. The stand 180 is coupled to the adjustable joint 10 at a top or proximal portion of the stand 180 via the receiver 16 of the adjustable joint 10 which is coupled to the stand 180 through a plurality of bolts, screws, adhesives, welds, or other equivalent means. A bottom or distal portion of the stand 180 is coupled to or integral with a foot 182. In some embodiments, the stand 180 includes an adjustment means 184, for example a tightening bolt or screw which allows a top portion of the stand 180 to be telescopically adjusted relative to a bottom portion of the stand 180 as is known in the art.

According to some embodiments, to adjust or change the relative angle between the fan 100 and the adjustable joint 10, a user grips the fan 100 and begins to rotate it with respect to the first head 18, the second head 20, or a combination thereof. For example, if the user rotates the fan 100 relative to the first head 18, this initially causes the torsion spring 74 to contract, thereby pulling the free end 76 off of an internal surface of first head 18 and permitting further rotational movement between the fan 100 and the adjustable joint 10. In this manner, the torsion spring 74 provides a threshold amount of force which must be overcome so as to adjust the orientation of the fan 100. As the flanges 30, 30' of the motor plate 12 rotates relative to the first lateral end 54 of the first head 18, the second flange 30' contacts and then applies a shear force to the substantially conically shaped tip 72 of the pin 70 that is currently disposed through a first selection aperture 38. Continued application of a shear force to the tip 72 begins to move or retract the pin 70 into the corresponding selection bore 64 and compress the compression spring 68 disposed therein. As the fan 100 continues to rotate, the second flange 30' is rotated until a subsequent or different selection aperture 38 is then aligned with the next or subsequent selection bore 64, thereby allowing the compression spring 68 disposed in that corresponding selection bore 64 to expand and push the pin 70 therefrom until the tip 72 has emerged. The user may continue to rotate the fan 100 relative to the adjustable joint 10 with each the plurality of pins 70 sequentially emerging from its corresponding selection bore 64 as each selection aperture 38 becomes aligned therewith until a desired angle between the fan 100 and the adjustable joint 10 is obtained. When the user stops applying rotational force to the fan 100, the torsion spring 74 relaxes and the free end 76 once again presses upon an internal surface of the first head 18, thereby preventing any further rotational movement between the fan 100 and the adjustable joint 10 until the user again applies a sufficient force.

Figure 9A:
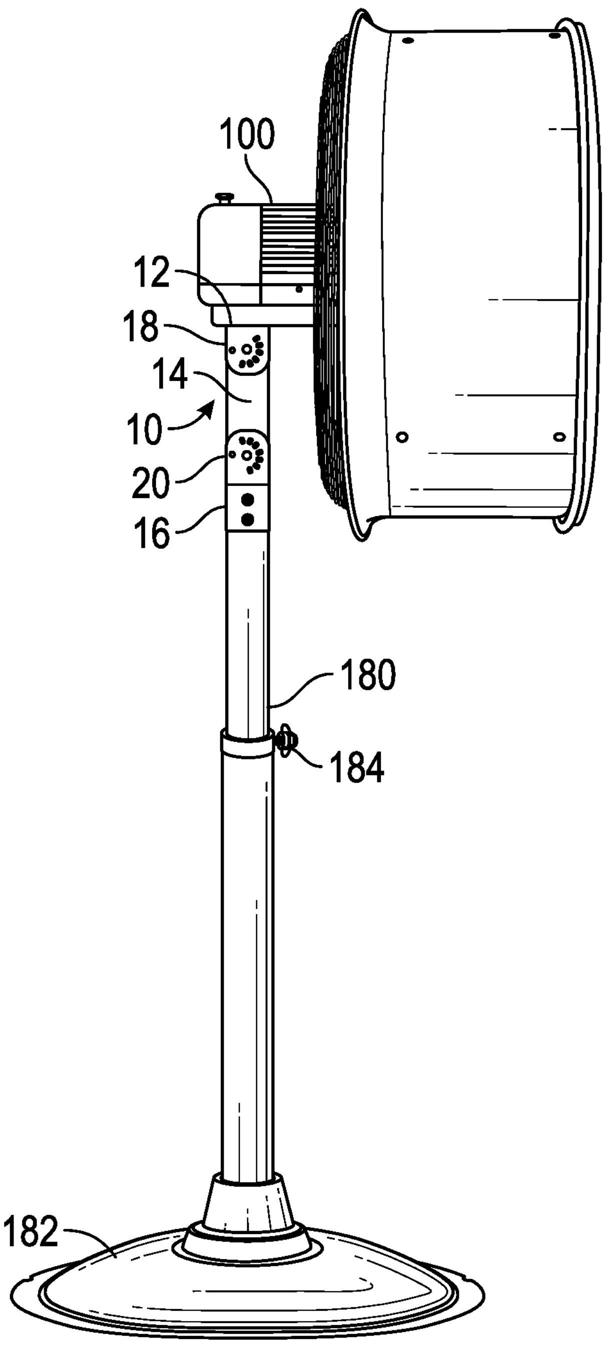
FIG. 9A is a side view of a fan and a stand incorporating the adjustable joint of FIG. 1 when the adjustable joint is in a vertical orientation.
Figure 9B:
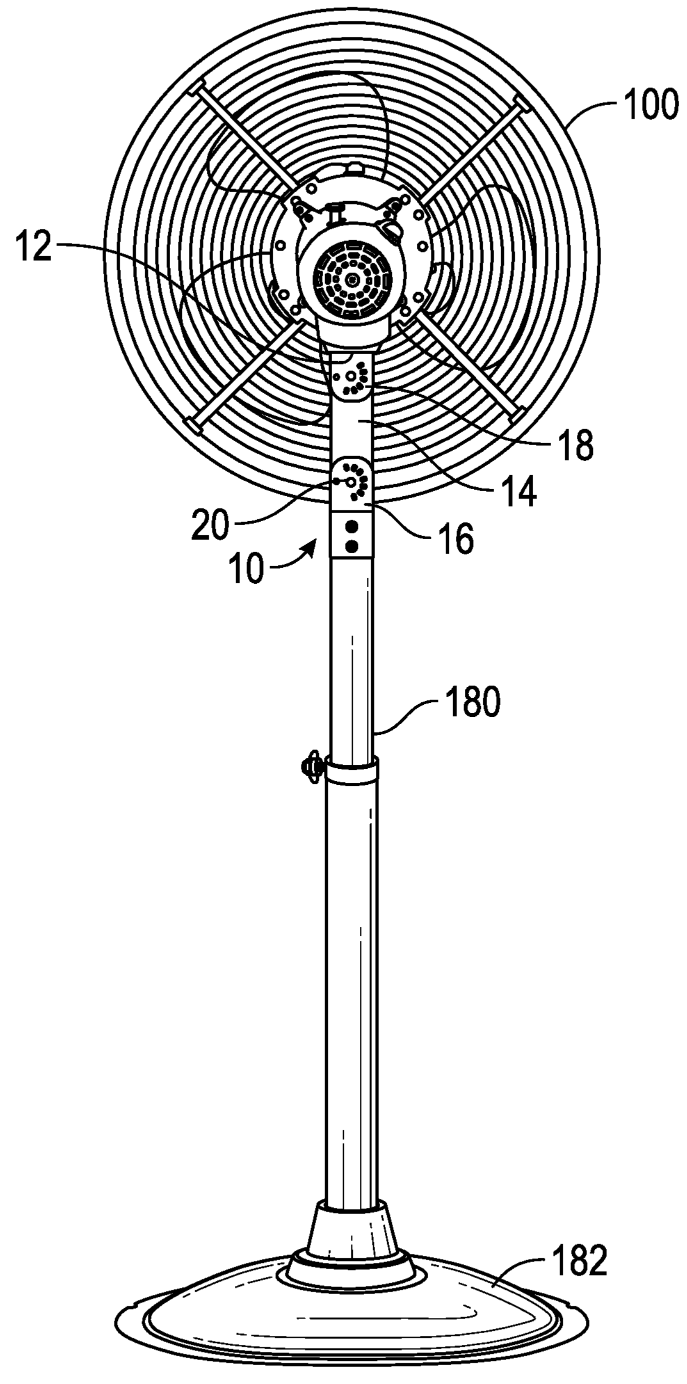
FIG. 9B is a rear view of the fan and the stand incorporating the adjustable joint of FIG. 9A.
Figure 9C:
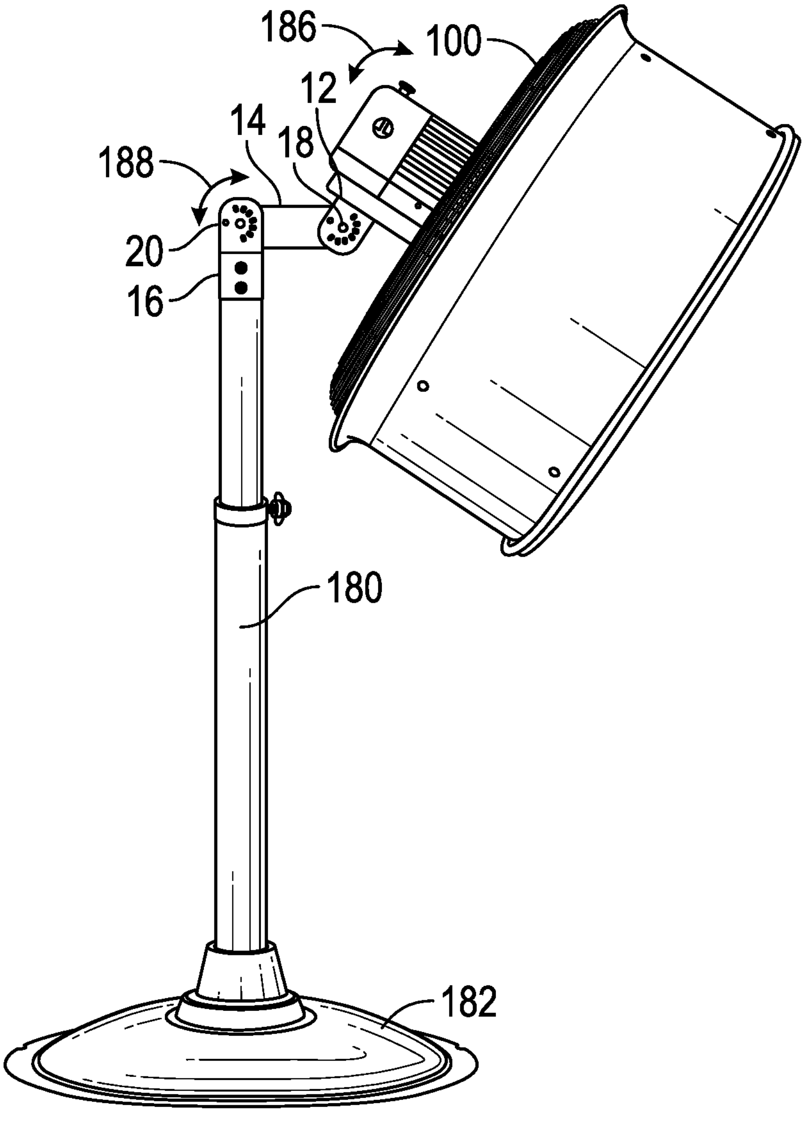
FIG. 9C is a side view of the fan and the stand incorporating the adjustable joint of FIG. 9A when the adjustable joint has been actuated to be in a horizontal position and the fan has been angled in a downward direction.
Figure 9D:
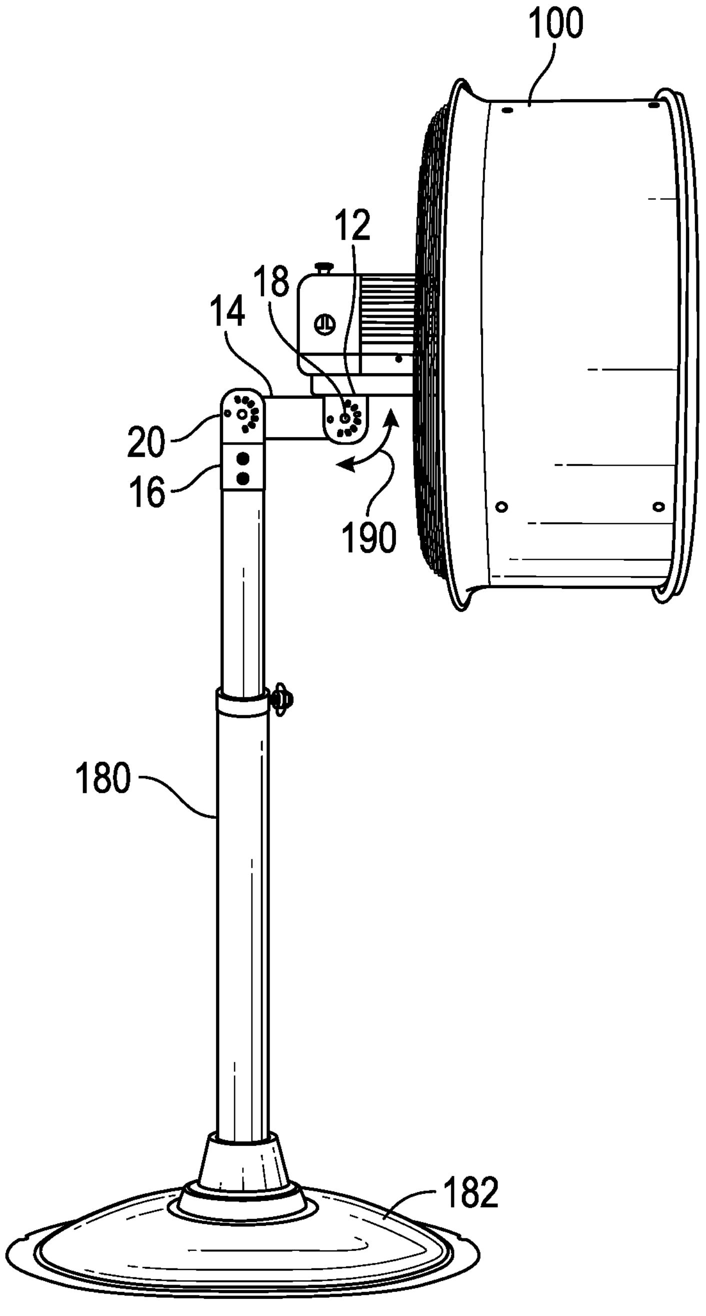
FIG. 9D is a side view of the fan and the stand incorporating the adjustable joint of FIG. 9C when the fan has been angled in a horizontal direction.

In one particular embodiment seen in FIGS. 9A and 9B, the fan 100, the adjustable joint 10, and the stand 180 are initially in a substantially vertical position. When a user begins to apply a rotational force to the fan 100, for example along arrow 186 as seen in FIG. 9C, the fan 100 rotates about the first head 18 and may be sufficiently angled downward. Because the first head 18 and the second head 20 are independently adjustable, the user may further manipulate the orientation of the fan 100 by rotating the connector 14 relative to the second head 20 in the same manner discussed above, for example, until the connector 14 is substantially parallel to the floor the stand 180 is disposed on as also seen in FIG. 9C. The user may continually adjust the fan 100 and/or the connector 14 until the fan 100 is at a desired angle, for example, by rotating the fan 100 back in the direction denoted by arrow 190 in FIG. 9D so that the fan 100 is substantially orientated parallel to the foot 182.

Figure 10A:
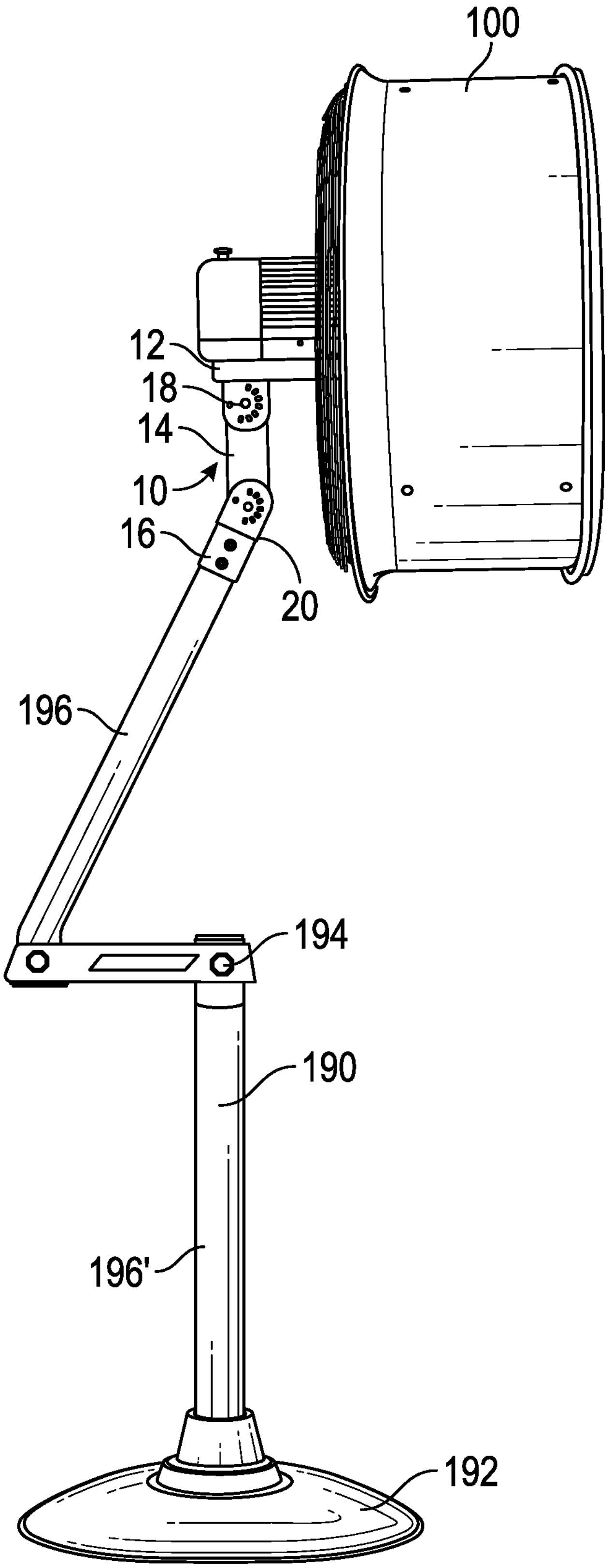
FIG. 10A is a side view of a fan and an adjustable stand incorporating the adjustable joint of FIG. 1 when the adjustable joint is in a vertical orientation.
Figure 10B:
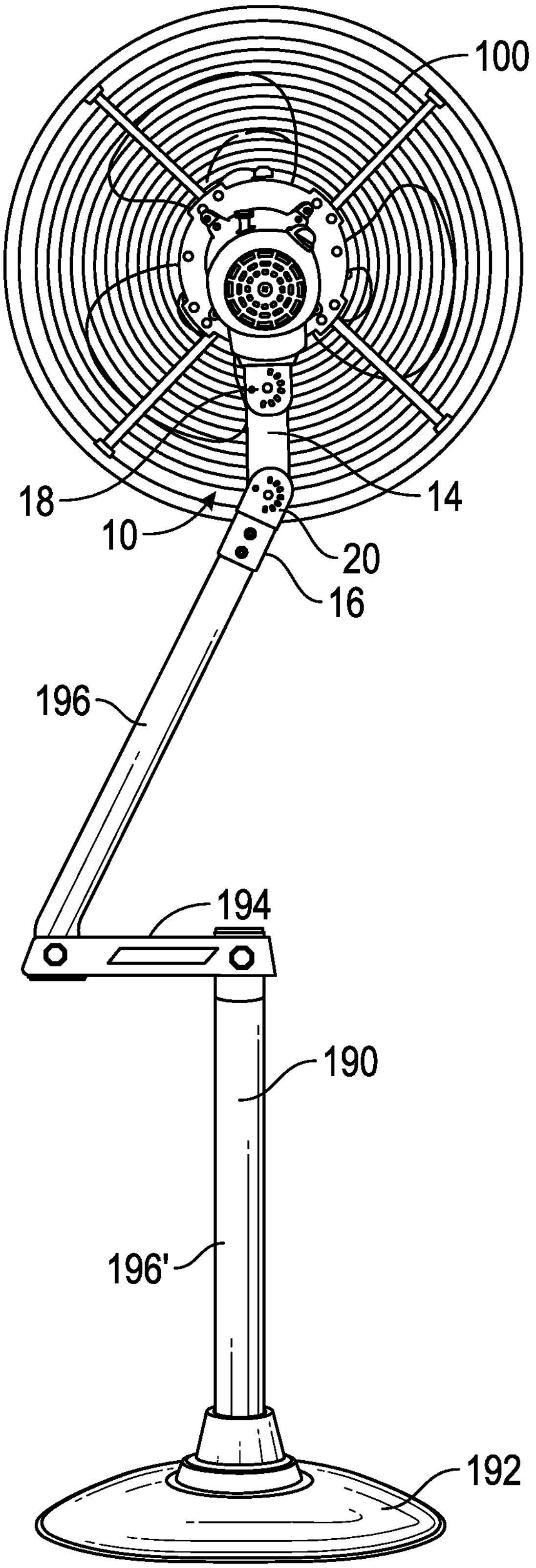
FIG. 10B is a rear view of the fan and the adjustable stand incorporating the adjustable joint of FIG. 10A.
Figure 10C:
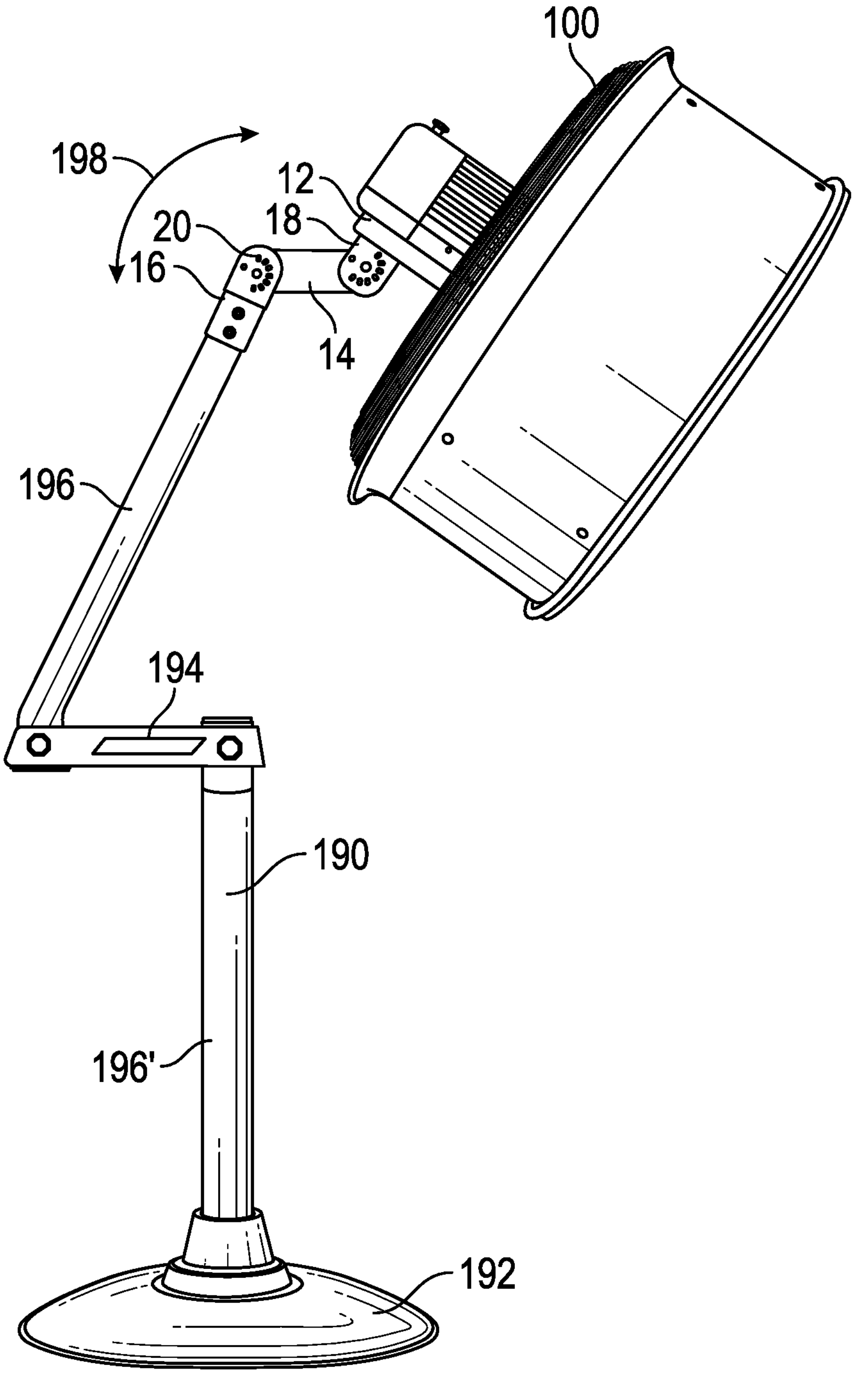
FIG. 10C is a side view of the fan and the adjustable stand incorporating the adjustable joint of FIG. 10A when the adjustable joint has been actuated to be in a horizontal position and the fan has been angled in a downward direction.

In some embodiments, the adjustable joint 10 is used to a couple a fan 100 to an adjustable stand 190 as seen in FIGS. 10A-10C. The adjustable stand 190 is coupled to the adjustable joint 10 at a top or proximal portion 196 of the adjustable stand 190 via the receiver 16 of the adjustable joint 10 which is coupled to the top portion 196 through a plurality of bolts, screws, adhesives, welds, or other equivalent means. A bottom or distal portion 196' of the adjustable stand 190 is coupled to or integral with a foot 192. In some embodiments, the stand 190 includes an adjustable horizontal offset 194, which allows a top portion 196 of the stand 190 to be independently adjusted relative to the bottom portion 196' of the stand 190 as is known in the art. The horizontal offset 194 further allows the top portion 196 and the fan 100 to be rotated about a vertical axis of the bottom portion 196' of the stand 190.

For example, as seen in FIGS. 10A, the fan 100, the adjustable joint 10, and the adjustable stand 190 are initially in a substantially vertical position, wherein the horizontal offset 194 sets the top portion 196 of the stand 190 at an angle relative to the bottom portion 196' of the stand 190. When a user begins to apply a rotational force to the fan 100, for example along arrow 198 as seen in FIG. 10C, the fan 100 rotates about the first head 18 and may be sufficiently angled downward. Because the first head 18 and the second head 20 are independently adjustable, the user may further manipulate the orientation of the fan 100 by rotating the connector 14 relative to the second head 20 in the same manner discussed above, for example, until the connector 14 is substantially parallel to the floor the adjustable stand 190 is disposed on. The user may continually adjust the fan 100 and/or the connector 14 until the fan 100 is at a desired angle.

Figure 11A:
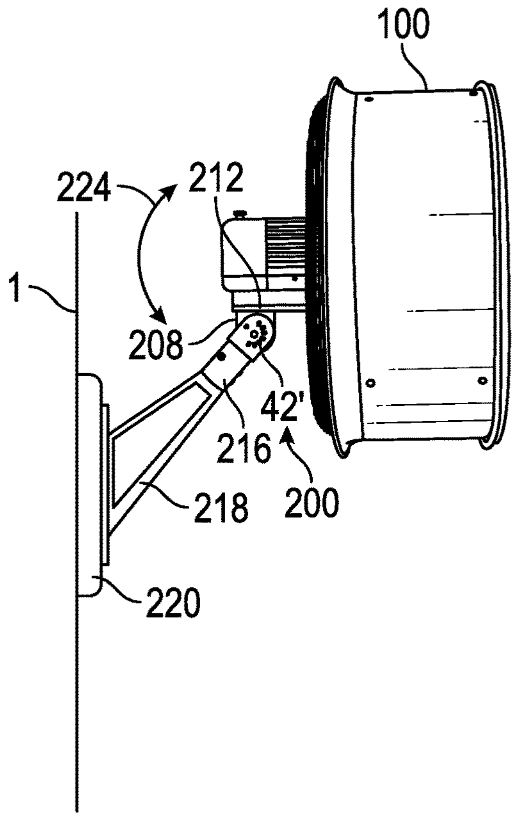
FIG. 11A is a side view of a fan and a wall mount incorporating the adjustable joint of the current invention when the fan has been angled in a horizontal direction.
Figure 11B:
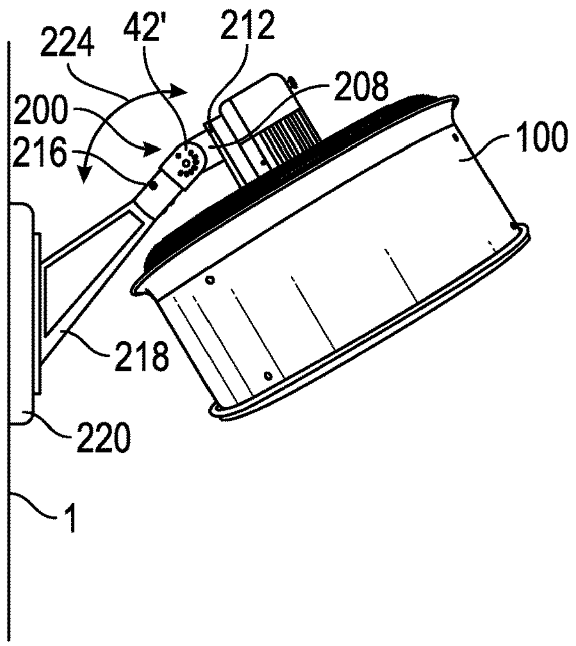
FIG. 11B is a side view of the fan and the stand incorporating the adjustable joint of FIG. 11A when the fan angled in a downward direction.
Figure 12A:
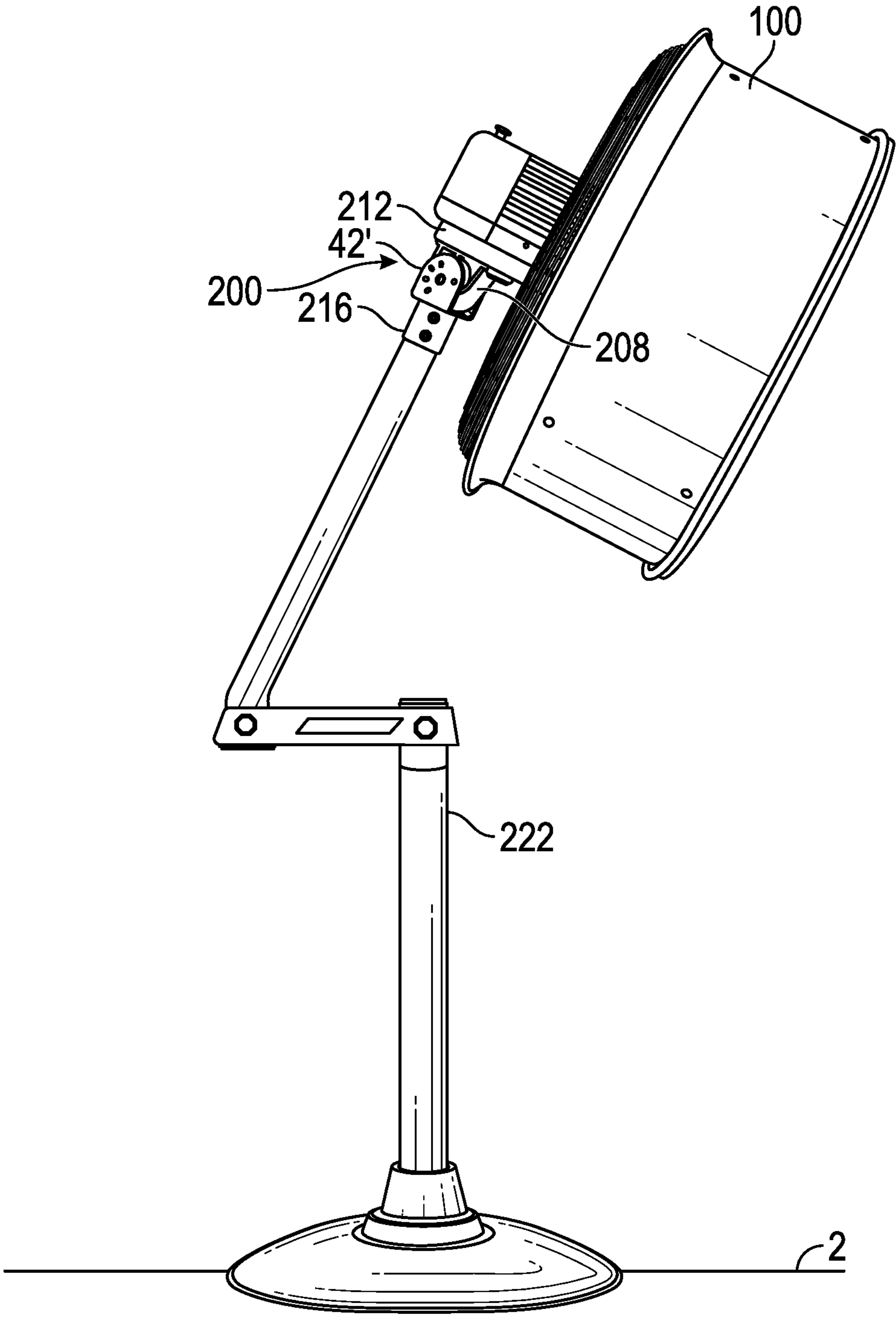
FIG. 12A is a side view of a fan and an adjustable stand incorporating the adjustable joint of the current invention when the adjustable stand has been angled in a downward direction.
Figure 12B:
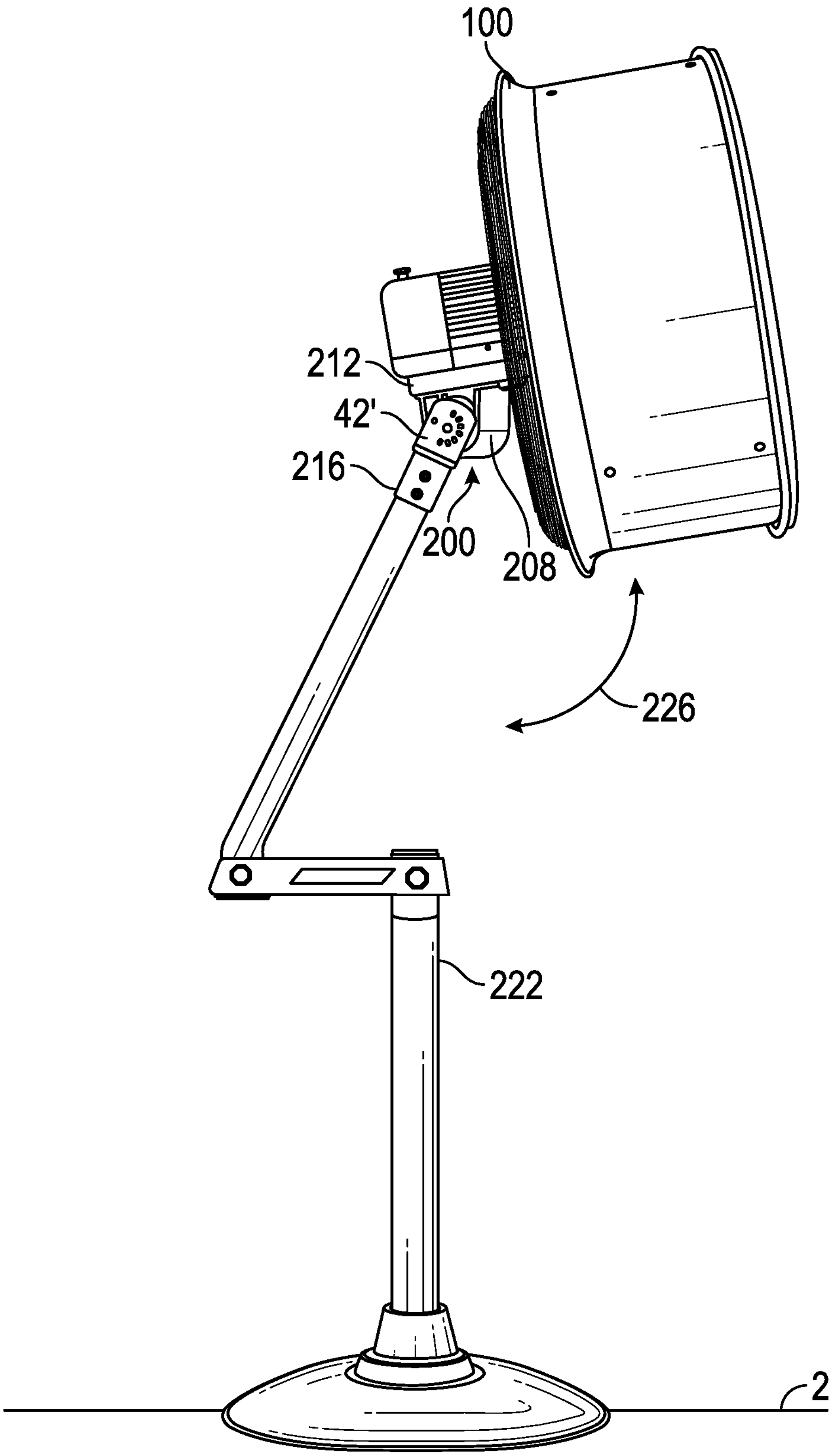
FIG. 12B is a side view of the fan and the adjustable stand incorporating the adjustable joint of FIG. 12A when the adjustable stand has been angled in a downward direction and when the fan has been angled in a upward direction.
Figure 12C:
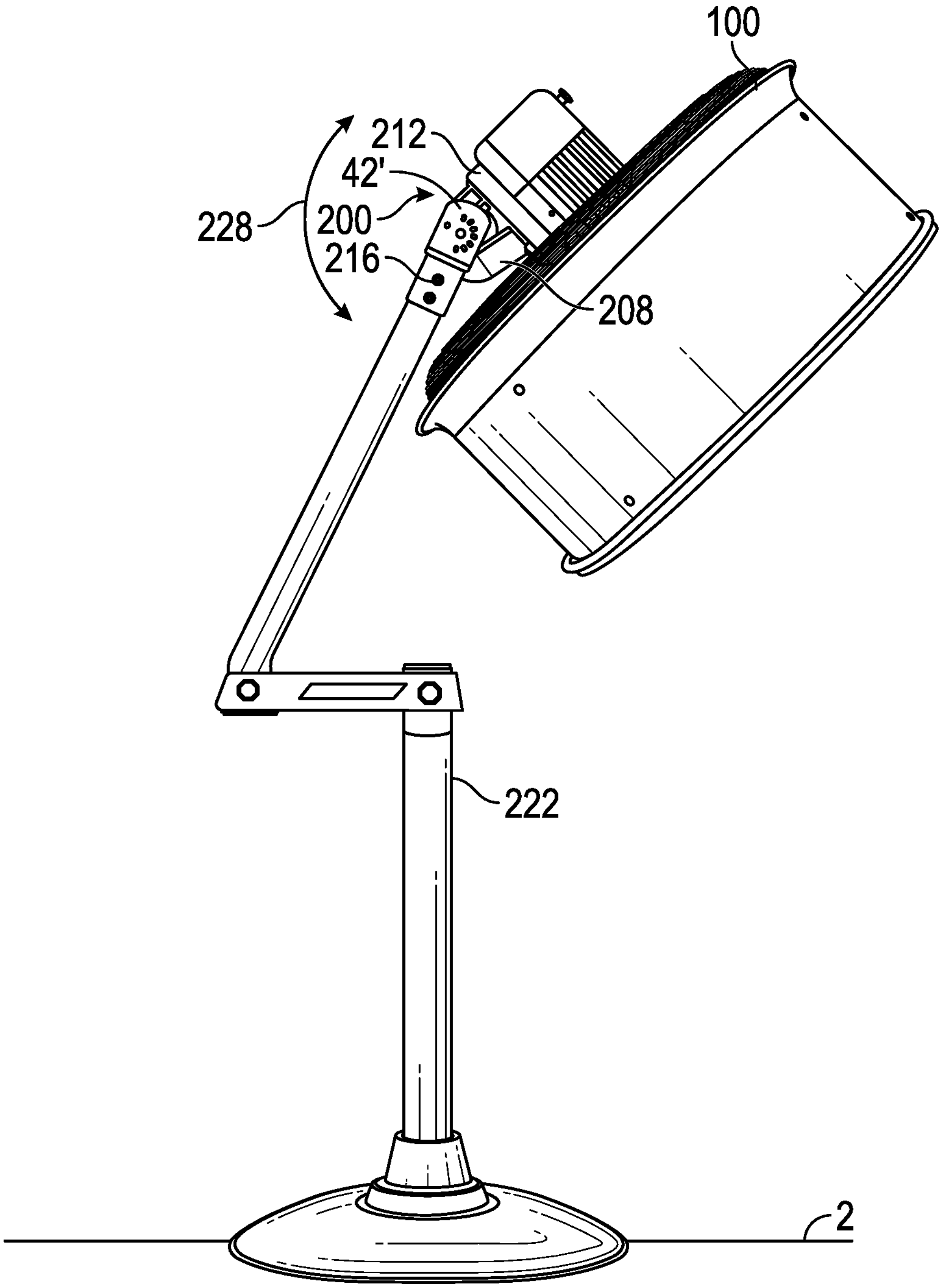
FIG. 12C is a side view of the fan and the adjustable stand incorporating the adjustable joint of FIG. 12A when the adjustable stand has been angled in a downward direction and when the fan has been angled in a downward direction.

In an alternative embodiment, the adjustable joint, denoted generally by reference numeral 200 in FIGS. 11A-12 does not comprise a connector 14 and instead comprises a head 208 disposed on a motor plate 212 that is directly coupled to a receiver 216 which in turn is coupled to another means for mounting, for example a wall mount 218 as seen in FIGS. 11A-11B or an adjustable stand 222 as seen in FIGS. 12A-12C.

Turning to FIGS. 11A and 11B, according to some embodiments, the adjustable joint 200 is used to a couple a fan 100 to a wall mount 218 that is in turn coupled to a wall plate 220 that may be coupled or disposed on a vertical surface 1 such as a wall. The wall mount 218 is coupled to the adjustable joint 200 via the receiver 216 of the adjustable joint 200 which is coupled to the wall mount 218 through a plurality of bolts, screws, adhesives, welds, or other equivalent means. A bottom or distal portion of the wall mount 218 is coupled to or integral with the wall plate 220.

As seen in FIG. 11A, the fan 100, the adjustable joint 200, and the wall mount 218 are initially in a substantially vertical position with the fan 100 orientated to move air perpendicularly relative to the wall 1. When a user begins to apply a rotational force to the fan 100, for example along arrow 224, the fan 100 rotates about the connection point between the first head 208 and the receiver 216, specifically with the first head 208 rotating with respect to the flanges 42, 42' of the receiver 216 which remain static. The user may continually adjust the fan 100 until the fan 100 is at a desired angle, for example, by rotating the fan 100 along either direction denoted by arrow 224 so that the fan 100 is orientated at a substantially downward angle relative to the wall 1 as seen in FIG. 11B.

Turning to FIGS. 12A-12C, according to some embodiments, the adjustable joint 200 is used to a couple a fan 100 to an adjustable stand 222 that is in turn coupled or disposed on a horizontal surface 2 such as a floor. The adjustable stand 222 is coupled to the adjustable joint 200 via the receiver 216 of the adjustable joint 200 which is coupled to the adjustable stand 222 through a plurality of bolts, screws, adhesives, welds, or other equivalent means. While FIGS. 12A-12C show the stand being an adjustable stand similar to the adjustable stand 190 seen in FIGS. 10A-10C, according to certain embodiments the stand may be any suitable means for maintaining the fan 100 at an elevated position including the telescopic stand 180 seen in FIGS. 9A-9D.

As seen in FIG. 12A, the fan 100, the adjustable joint 200, and the adjustable stand 222 are initially in an upright position with the fan 100 orientated to move air at a downward angle towards the floor 2. When a user begins to apply a rotational force to the fan 100, for example in either direction along arrow 226 seen in FIG. 12B, the fan 100 rotates about the connection point between the first head 208 and the receiver 216, specifically with the first head 208 rotating with respect to the flanges 42, 42' of the receiver 216 which remain static. The user may continually adjust the fan 100 until the fan 100 is at a desired angle, for example, by rotating the fan 100 from the front in either direction denoted by arrow 226 seen in FIG. 12B, or by rotating the fan 100 from the back in either direction denoted by arrow 228 seen in FIG. 12C.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An adjustable joint for disposing a fan at a selected angle relative to an object, the adjustable joint comprising:

a first pair of flanges coupled to the fan;

a first head configured to be inserted in between the first pair of flanges;

a second pair of flanges coupled to a receiver;

a second head configured to be inserted in between the second pair of flanges;

a torsion spring disposed between the first head and the first pair of flanges; and a plurality of compression springs disposed within the first head, wherein each of the plurality of compression springs are configured to drive a pin from within the first head through one of a plurality of selection apertures defined in one of the first pair of flanges.

2. The adjustable joint of claim 1 further comprising:

a first end of a connector coupled to the first head, wherein the second head is coupled to a second end of the connector, the second end of the connector opposing the first end of the connector.

3. The adjustable joint of claim 2 further comprising:

a torsion spring disposed between the second head and the second pair of flanges; and a plurality of compression springs disposed within the second head, wherein each of the plurality of compression springs are configured to drive a pin from within the second head through one of a plurality of selection apertures defined in one of the second pair of flanges.

4. The adjustable joint of claim 2 wherein the first pair of flanges are disposed on a motor plate and wherein the second pair of flanges are disposed on the receiver.

5. The adjustable joint of claim 1 wherein the first pair of flanges are disposed on a motor plate.

6. The adjustable joint of claim 5 wherein the receiver is configured to be coupled to a stand or wall mount.

7. The adjustable joint of claim 1 wherein each of the plurality of compression springs are disposed within a corresponding plurality of selection bores defined within the first head.

8. The adjustable joint of claim 1 wherein the torsion spring comprises a fixed end coupled to at least one of the first pair of flanges.

9. A fan comprising:

a fan housing coupled to a motor;

an adjustable joint coupled to the motor at a first end of the adjustable joint; and a mounting means coupled to a second end of the adjustable joint, the second end of the adjustable joint opposing the first end of the adjustable joint, wherein the adjustable joint comprises:

a first pair of flanges coupled to the motor;

a first head configured to be inserted in between the first pair of flanges;

a second pair of flanges coupled to the mounting means;

a second head configured to be inserted in between the second pair of flanges a torsion spring disposed between the first head and the first pair of flanges; and a plurality of compression springs disposed within the first head, wherein each of the plurality of compression springs are configured to drive a pin from within the first head through one of a plurality of selection apertures defined in one of the first pair of flanges.

10. The fan of claim 9 wherein the adjustable joint further comprises a connector disposed between the first end of the adjustable joint and the second end of the adjustable joint.

11. The fan of claim 9 wherein the mounting means comprises a stand or a wall mount.

12. The fan of claim 9 wherein the adjustable joint further comprises a receiver disposed on the second end of the adjustable joint and coupled to the mounting means.

* * * * *